(No Model.)
E. W. RICHTER.
MEANS FOR PREVENTING AIR BUBBLES IN ICE.
No. 529,194. Patented Nov. 13, 1894.
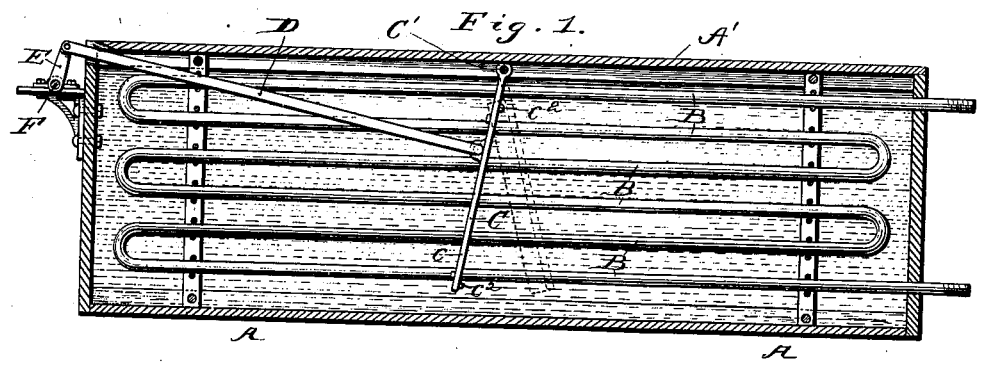
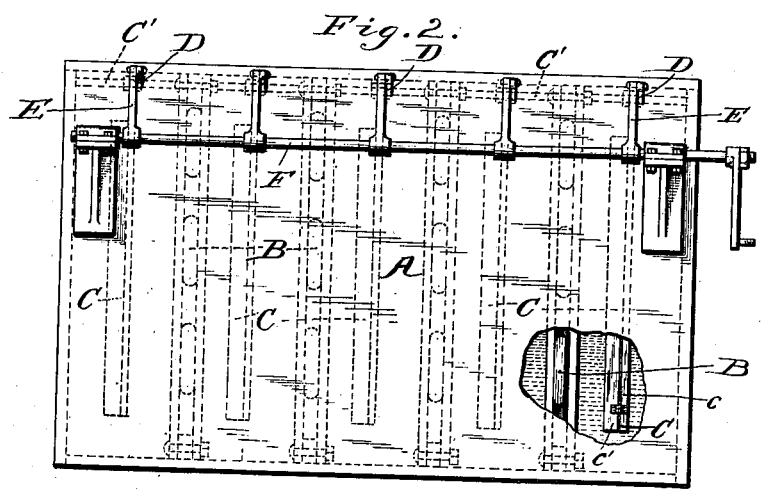
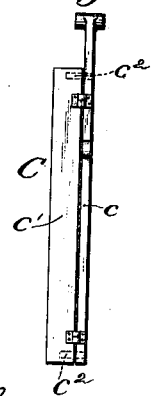
Witnesses,
Walter Tamarise
George B. Squire
Inventor.
Ernest W. Richter
By Chas. J. Stockman
Atty.

UNITED STATES PATENT OFFICE.

ERNEST W. RICHTER, OF WASHINGTON, DISTRICT OF COLUMBIA.

MEANS FOR PREVENTING AIR-BUBBLES IN ICE.

SPECIFICATION forming part of Letters Patent No. 529,194, dated November 13, 1894.

Application filed November 11, 1893. Serial No. 490,660. (No model.)

*To all whom it may concern:*

Be it known that I, ERNEST W. RICHTER, a citizen of the United States, residing at Washington, in the District of Columbia, have invented certain new and useful Improvements in Means for Preventing the Formation of Air-Bubbles in Ice; and I do hereby declare the following to be a full, clear, and exact description of the invention, such as will enable others skilled in the art to which it appertains to make and use the same.

This invention relates to that class of apparatus for manufacturing ice in which the refrigerant passes through coils extending through the tank containing the fresh water to be frozen, but it has particular reference to the means proposed to be employed therein for preventing the formation of the air bubbles in the ice (and thereby producing ice of superior quality to, and of increased weight, size for size, than "white ice," so called) by so agitating the water that it will be caused to prevent the air escaping from the water from permanently adhering to the surface of the ice being formed and being frozen thereinto.

Heretofore devices proposed for this purpose have been disadvantageous in that they are too cumbersome, expensive and require too much power to operate them, or else they do not effectually accomplish their purpose without materially retarding the formation of the ice.

The object, therefore, of my invention is to provide a means for washing the air bubbles from the surface of the ice which while being of extremely simple construction and operated by a minimum of power, will effectually wash all the air bubbles off the ice without materially retarding congelation.

To this end the invention consists in so mounting, operating and constructing the agitators that they will gently agitate the water in every direction, substantially as hereinafter described and particularly pointed out in the subjoined claims.

In the accompanying drawings illustrating the invention:—Figure 1 is a longitudinal sectional view of the tank and its contained parts of a "block system" apparatus embodying my invention. Fig. 2 is an end view of the same, showing the series of agitators and the other parts located in the tank in dotted lines. Fig. 3 is a detail view of the agitator blade or paddle.

A designates the ordinary tank of an apparatus for manufacturing ice, and B designates the coils through which the freezing agent passes. As is well known the tank A is filled to a proper depth with fresh water and the parts of the water near the coils are frozen by the low temperature produced by the freezing agent passing through said coils.

C designates the movable paddles or agitators, which are located in the tank in about the center of the spaces between the vertical series of coils. Each of the paddles is secured at its upper end to a horizontal rock shaft, C', (which is journaled in suitable bearings in the tank and forms a pivotal support for its paddle) and is connected, by a pivoted arm D, with a crank, E, mounted on a shaft, F. Said shaft F extends entirely across the front end of the tank A and is connected with any suitable operating mechanism, such as a small steam engine or an ammonia pump of the ice making apparatus, and its movement is transmitted, by means of the crank E and arms D, to the series of paddles C, which latter are thereby swung back and forth in the arc of a circle on their pivotal supports, C', thereby agitating the water in both a direction substantially parallel with the length of the coils and inclinatorily in an upward and downward direction and also causing the paddles to act on a considerable part in the body of the water notwithstanding their comparative smallness. In order to further agitate the water, and also to reduce the power required to operate the paddles, each of the latter is divided longitudinally to form the two parts, $c$ and $c'$, which are hinged together at their adjacent edges, and one of said parts, as, $c$, is provided at one side with a pin or pins, $c^2$, which projects over the line of division of said two parts, or it may be otherwise suitably constructed to prevent movement beyond a certain point of the swinging part, $c'$, in one direction while permitting it to turn on its hinges in the other direction. Thus in the movement of the blades in one direction with its horizontal pivotal support, the swinging part, $c'$, will be caused, by the action of the water thereon, automatically to turn gradually in the arc of a circle and present its side of greatest resistance to the water, while in the movement of the blade in the other direction the swinging part will automatically turn and gradually assume a position parallel with the direction of its movement. Obviously, the swinging part $c'$, while turning on its hinge will create a water current in a direction toward the coils and at a considerable angle with respect to that created by the paddle swinging on its horizontal pivot. The combined movement of the paddles—that is to say, up and down and laterally, both in the arcs of circles—is therefore of the greatest importance as it enables the paddles to be of the lightest, simplest and cheapest possible construction and to be operated with the expenditure of a minimum amount of power, and also, by creating gentle currents in every direction effectually washes the bubbles off the surface of the ice being formed, without materially retarding the formation of the ice.

I have shown my invention as applied to the class of apparatus for making ice artificially under the "block system," because it is especially designed for use in such apparatus, but it is equally as well adapted for use in the plate system, or in any system of making ice in which the coils through which the freezing agent passes is immersed in the water to be frozen. It is well known that such systems have heretofore proved to be impractical in many respects and if they were practical would possess many advantages over the "can system," in that they dispense with the use of cans and brine and can employ a lower temperature than said can system—which latter cannot freeze with a lower temperature than 14° above zero without producing "white ice" while the block or plate systems commonly operates with a temperature at zero.

Practical experience has demonstrated that transparent ice—i. e., ice entirely free from air bubbles—may be produced with an apparatus operating under the block or plate systems with my invention applied thereto at a temperature of 20° below zero, and that, therefore, it makes such apparatus practical and capable of producing ice of superior quality and in greater quantity than it could before the application of my invention thereto.

The shafts, $C'$, are preferably journaled in half bearings, so that when the cover $A'$ of the tank is removed, said shaft, with its attached paddle, may be lifted out of the tank when the ice is to be cut.

I do not wish to be understood as claiming broadly an agitating blade or paddle for ice making apparatuses, constructed so that during its movement a part of it will swing automatically. Nor do I wish to be understood as claiming broadly a blade or paddle movable in the arc of a circle, as I am aware that such devices, separately considered, are not broadly new.

Having now described my invention, what I believe to be new, and desire to secure by Letters Patent, and what I therefore claim, is—

1. In a means for agitating the water in the freezing tank of an ice making apparatus, a pivotally supported swinging paddle, designed to be located in said tank and constructed in two parts hinged together at their adjacent edges, substantially as shown and for the purposes specified.

2. The herein described means for agitating the water in the freezing tank of an ice making apparatus consisting of a shaft having cranks, rock-shaft, paddles, secured at their ends to said rock-shafts, and each divided longitudinally into two parts hinged together at their adjacent edges, and pivoted arms connecting said cranks and paddles together, substantially as described and for the purposes specified.

In testimony whereof I affix my signature in presence of two witnesses.

ERNEST W. RICHTER.

Witnesses:
CHARLES J. STOCKMAN,
O. H. BUDLONG.